US012749953B2

(12) United States Patent
Shimizu et al.

(10) Patent No.: US 12,749,953 B2
(45) Date of Patent: Sep. 29, 2026

(54) MOTOR DRIVER CIRCUIT AND DRIVING METHOD, COOLING DEVICE AND ELECTRONIC APPARATUS USING THE SAME

(71) Applicant: ROHM CO., LTD., Kyoto (JP)

(72) Inventors: Hiroyuki Shimizu, Kyoto (JP); Tsubasa Sakurai, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 192 days.

(21) Appl. No.: 18/623,349

(22) Filed: Apr. 1, 2024

(65) Prior Publication Data

US 2024/0333111 A1 Oct. 3, 2024

(30) Foreign Application Priority Data

Mar. 30, 2023 (JP) ................................ 2023-056547
Mar. 29, 2024 (JP) ................................ 2024-055336

(51) Int. Cl.

| | |
|---|---|
| ***H02K 11/33*** | (2016.01) |
| ***H02K 9/06*** | (2006.01) |
| ***H02K 11/215*** | (2016.01) |
| ***H02P 6/20*** | (2016.01) |
| ***H02P 27/06*** | (2006.01) |

(52) U.S. Cl.
CPC ............... *H02K 11/33* (2016.01); *H02K 9/06* (2013.01); *H02K 11/215* (2016.01); *H02P 6/20* (2013.01); *H02P 27/06* (2013.01)

(58) Field of Classification Search
CPC ........ H02K 11/215; H02K 11/33; H02K 9/06; H02P 27/06; H02P 6/16; H02P 6/20
See application file for complete search history.

(56) References Cited

U.S. PATENT DOCUMENTS

2023/0253861 A1* 8/2023 Matsumoto ............... H02P 6/17 310/68 R

FOREIGN PATENT DOCUMENTS

JP 2022088253 A * 6/2022 ................ H02P 6/20

* cited by examiner

*Primary Examiner* — Christopher M Koehler
*Assistant Examiner* — Ethan Nguyen Vo
(74) *Attorney, Agent, or Firm* — CANTOR COLBURN LLP

(57) ABSTRACT

The present disclosure provides a control logic circuit. The control logic circuit controls an inverter circuit connected to a motor based on Hall signal. The control logic circuit generates an energization pattern for a compulsory synchronous drive, and switches between a high detection period and a low detection period in accordance with the energization pattern. The control logic circuit sets an internal Hall signal as high when a high level of the Hall signal is detected during the high detection period and sets the internal Hall signal as low when a low level of the Hall signal is detected during the low detection period. Therefore, the control logic circuit generates an FG signal according to the internal hall signal.

10 Claims, 10 Drawing Sheets

MOTOR DRIVER CIRCUIT AND DRIVING METHOD, COOLING DEVICE AND ELECTRONIC APPARATUS USING THE SAME

CROSS REFERENCE TO RELATED APPLICATIONS

The present invention claims priority under 35 U.S.C. § 119 to Japanese Application No. 2023-056547, filed on Mar. 30, 2023, and Japanese Application No. 2024-055336, filed on Mar. 29, 2024, the entire contents of which being incorporated herein by reference.

TECHNICAL FIELD

The present disclosure relates to a motor driver circuit.

BACKGROUND

A motor driver circuit outputs a frequency generation (FG) signal representing a rotation speed of a motor which is a driving target to the outside. For a motor attached with a sensor, in a state of rotating at a fast rotation speed at a certain level, the motor is able to generate the FG signal based on a Hall signal.

When the motor is stopped, the Hall signal is kept at a fixed level. Thus, when driving of the motor starts, the motor driver circuit is irrelevant to the Hall signal and switches a driving phase at a predetermined time internal according to a predetermined sequence. The above is referred to as a compulsory synchronous drive.

PRIOR ART DOCUMENT

Patent Publication

[Patent document 1] Japan Patent Publication No. 2022-088253

DETAILED DESCRIPTION OF THE EMBODIMENTS

Summary of Embodiments

Figure 1:
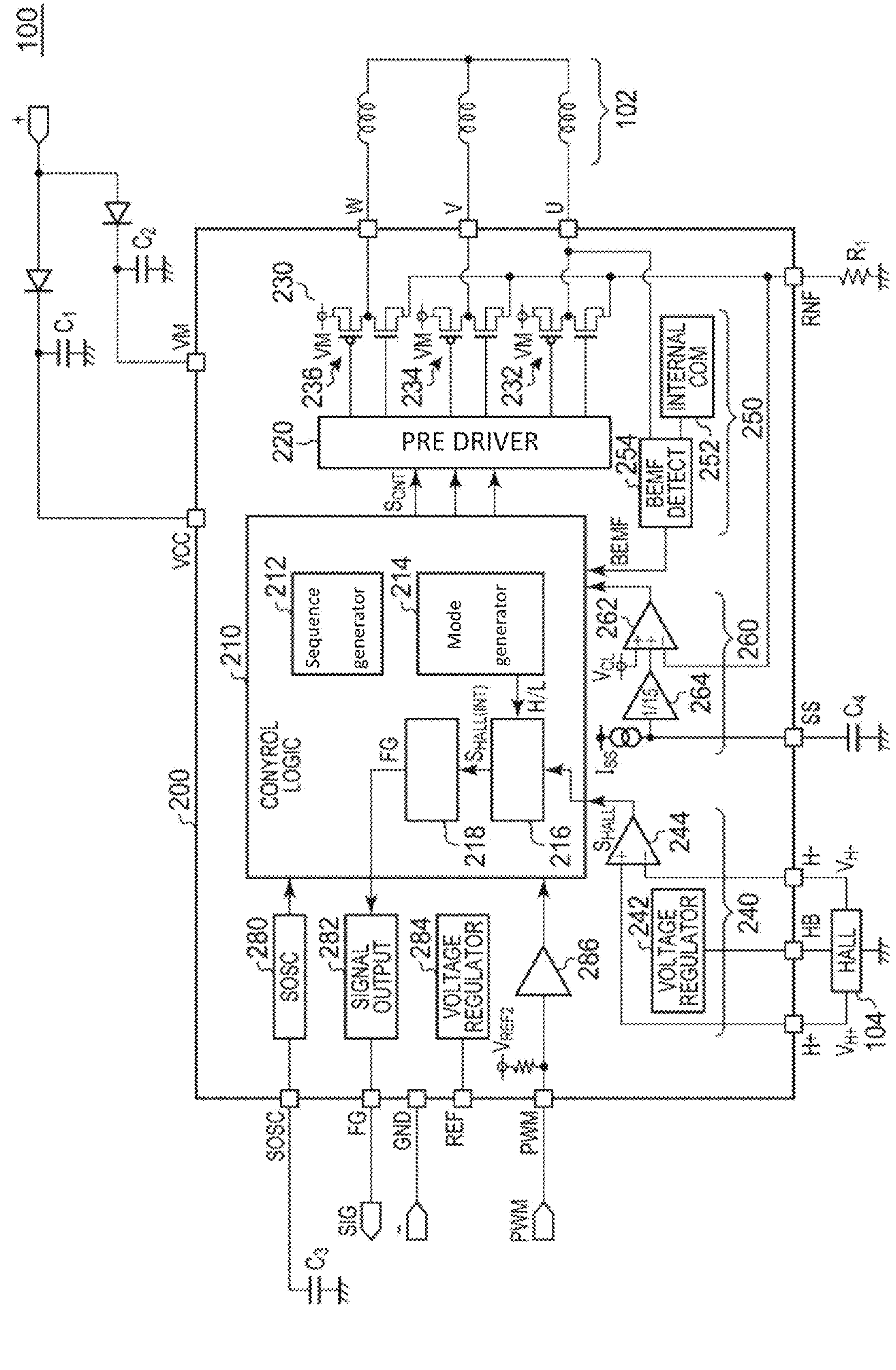
FIG. 1 is a circuit diagram of a system including a motor driver circuit according to an embodiment.

A summary of several exemplary embodiments of the disclosure is described below. The summary serves as the preamble of the detailed description to be given shortly and aims to provide fundamental understanding of the embodiments by describing several concepts of one or more embodiments in brief. It should be noted that the summary is not to be construed as limitations to the scope of the application or disclosure. Moreover, the summary does not necessarily encompass all embodiments that can be taken into account and does not provide definitions for essential constituent elements of the embodiments. For the sake of better description, "one embodiment" sometimes refers to one embodiment (an implementation example or a variation example) or multiple embodiments (implementation examples or variation examples) described in the present application.

A motor driver circuit according to an embodiment includes a control logic circuit that controls a bridge circuit connected to a motor based on a Hall signal. The control logic circuit is configured to generate an energization pattern for a compulsory synchronous drive, switch between a high detection period and a low detection period in accordance with the energization pattern, set an internal Hall signal as high when a high level of the Hall signal is detected during the high detection period, set the internal Hall signal as low when a low level of the Hall signal is detected during the low detection period, and generate a frequency generation (FG) signal according to the internal Hall signal.

In the compulsory synchronization period, assuming that a rotor follows a rotating magnetic field based on the energization pattern, a period in which the Hall signal should be high is defined as the high detection period, and a period in which the Hall signal should be low is defined as the low detection period. Moreover, in the high detection period, when a high level of the Hall signal is detected, the Hall signal is considered correct and the internal Hall signal is set as high, and when a low level of the Hall signal is detected, the Hall signal is considered an error and omitted, and the level of the internal Hall signal is maintained. Similarly, in the low detection period, when a low level of the Hall signal is detected, the Hall signal is considered correct and the internal Hall signal is set as low, and when a high level of the Hall signal is detected, the Hall signal is considered an error and omitted, and the level of the internal Hall signal is maintained. The internal Hall signal generated accordingly becomes a signal in which influences such as flutter is removed from the Hall signal, and so a correct FG signal can be generated by using the internal Hall signal.

In one embodiment, the motor driver circuit can further include a bridge circuit.

In one embodiment, the motor driver circuit can also be integrated with a semiconductor substrate. The driver circuit can also be integrated with a semiconductor substrate. The so-called "integrated" includes a situation in which all constituting elements of a circuit are formed on a semiconductor substrate, or a situation in which main constituting elements of a circuit are integrated. In order to adjust circuit constants, a part of resistors or capacitors may be arranged outside the semiconductor substrate. By integrating circuits on one chip, the circuit area is reduced, and characteristics of circuit elements are kept uniform.

In one embodiment, the motor can also be a fan motor.

A cooling device according to an embodiment can include a fan motor with a sensor, and any one of the motor driver circuits above for driving the motor.

An electronic apparatus according to an embodiment can include a processor, a fan motor for cooling the processor, and any one of the motor driver circuits above for driving the motor.

EMBODIMENTS

Details of the present application are described based on appropriate embodiments with reference to the accompanying drawings below. The same or equivalent constituent elements, parts and processes in the accompanying drawings are represented by the same denotations, and repeated description is omitted as appropriate. Moreover, the embodiments are illustrative of and are not restrictive of the disclosure. All features and combinations thereof described in the embodiments are not necessarily intrinsic characteristics of the disclosure.

In the present application, an expression "a state of a component A connected to a component B" further includes, in addition to a situation where the component A and the component B are directly connected, a situation where the component A is indirectly connected to the component B via another component, and the indirect connection does not result in substantial influences on their electrical connection or does not impair functions or effects exerted by their connection.

Similarly, an expression "a state of a component C arranged between a component A and a component B" also includes, in addition to a situation where the component A and the component C, or the component B and the component C are directly connected, an indirect connection via another component, provided that the indirect connection does not result in substantial influences on their electrical connection or does not impair functions or effects exerted by their connection.

FIG. 1 shows a circuit diagram of a system 100 including a motor driver circuit 200 according to an embodiment. The motor driver circuit 200 drives a motor 102. The motor 102 is a three-phase brushless direct-current (DC) motor, and is a motor installed with a Hall sensor attached to a Hall element 104. For example, the motor 102 can be a fan motor, and the system 100 can be a cooling device. Alternatively, the system 100 can also be an electronic apparatus having a cooling device and a central processing unit (CPU) as a cooling target.

A Hall bias voltage $V_{HB}$ generated by the motor driver circuit 200 is supplied to the Hall element 104. An output of the Hall element 104 represents a pair of Hall voltages $V_{H+}$ and $V_{H-}$ of a position of a rotor of the motor 102.

The motor driver circuit 200 includes a U-phase output U, a V-phase output V and a W-phase output W connected to a U phase, a V phase and a W phase of the motor 102, respectively. Moreover, the motor driver circuit 200 includes Hall input terminals HIN+ and HIN− receiving the Hall voltages $V_{H+}$ and $V_{H-}$. An OUT #(where #=U, V or W) of each phase may take a high (H), low (L) or high-impedance (HiZ) state. In addition to a fixed high state, the state high H can also include a state having undergone pulse-width modulation (PWM).

The motor driver circuit 200 includes a control logic circuit 210, a pre-driver 220, an inverter circuit 230, a Hall signal generation circuit 240, a back electromotive force (BEMF) detection circuit 250, a current limiting circuit 260, an oscillator 280, an output circuit 282, a regulator circuit 284 and a buffer 286, which are integrated on a semiconductor substrate. The so-called "integrated" includes a situation in which all constituting elements of a circuit are formed on a semiconductor substrate, or a situation in which main constituting elements of a circuit are integrated. In order to adjust circuit constants, a part of resistors or capacitors may be arranged outside the semiconductor substrate.

A power supply voltage $V_{DD}$ from an external power supply (not shown) is supplied to power supply terminals (VDD and VM) of the motor driver circuit 200.

The oscillator 280 generates a system clock signal. An oscillation frequency of the oscillator 280 can be adjusted according to a capacitance value of a capacitor $C_3$ connected to a frequency setting pin SOSC.

The regulator circuit 284 generates a voltage VREG stabilized at a predetermined level. The voltage VREG is supplied to various circuit blocks within the motor driver circuit 200.

The Hall signal generation circuit 240 includes a Hall bias circuit 242 and a Hall comparator 244. The Hall bias circuit 242 supplies a bias signal to the Hall element 104 via an HB pin. The Hall comparator 244 compares the Hall voltages $V_{H+}$ and $V_{H-}$, and generates a Hall signal $S_{HALL}$ indicating a magnitude relationship. The Hall signal $S_{HALL}$ is a pulse signal which changes each time the Hall voltages $V_{H+}$ and $V_{H-}$ intersect.

The back electromotive force detection circuit 250 generates a BEMF signal by comparing a neutral point voltage $V_{COM}$ of the motor 102 with an output voltage Vu. In the example, a voltage source 252 generates the neutral point voltage $V_{COM}$. The neutral point voltage $V_{COM}$ can be an intermediate voltage $V_M/2$ of a power supply voltage $V_M$, or can be obtained by dividing three-phase output voltages $V_U$, $V_V$, and $V_W$ by a star-connected resistor network. Alternatively, when the motor 102 is provided with a tap having a neutral point, a voltage of the tap can be used as the neutral point. In addition, a detection window is opened while a back electromotive force is detected, and an output of the inverter circuit 230 is set to high-impedance within a period of the window.

A command signal for a rotation speed of the motor 102 is input to a rotation speed control pin PWM. The command signal is applied as a pulse-width modulated signal and has a duty cycle representing a target value of the rotation speed.

The control logic circuit 210 generates a control signal $S_{CNT}$ controlling the state of the inverter circuit 230 based on the Hall signal $S_{HALL}$ and the BEMF signal. For example, the control logic circuit 210 can generate the control signal $S_{CNT}$ by means of 120° energization or 180° energization (or 150° energization). The control logic circuit 210 can also scale a duty cycle of a PWM control of the motor 102 according to the target speed of the motor 102 (a duty factor of the PWM signal).

The pre-driver 220 drives the inverter circuit 230 based on the control signal $S_{CNT}$ generated by the control logic circuit 210. The inverter circuit 230 is a three-phase bridge circuit, and includes a U-phase branch 232, a V-phase branch 234 and a W-phase branch 236. The U-phase branch 232 includes an upper arm UH and a lower arm UL, the V-phase branch 234 includes an upper arm VH and a lower arm VL, and the W-phase branch 236 includes an upper arm WH and a lower arm WL. The output OUT #is high when the upper arm #H is on and the lower arm #L is off, the output OUT

#is low when the upper arm #H is off and the lower arm #L is on, and the output OUT #is high-impedance when both of the upper arm #H and the lower arm #L are off.

The inverter circuit 230 is connected to a shunt resistor $R_1$ via a resistor connection pin RNF. In the shunt resistor $R_1$, a voltage drop (a current detection signal) corresponding to a current flowing through the motor 102 is generated. A current clamp comparator 262 of the current limiting circuit 260 compares the current detection signal with a clamping voltage $V_{CL}$. Based on an output from the current clamp comparator 262, the control logic circuit 210 turns off an arm that is on. Accordingly, current limiting is applied. The current limiting circuit 260 has a soft-start function. A current source 266 charges a capacitor $C_4$ connected to a pin SS. An amplifier 264 scales a voltage of the pin SS and generates a soft-start voltage $V_{SS}$. The current clamp comparator 262 sets the lower one of the voltages $V_{CL}$ and $V_{SS}$ as a clamping level.

The control logic circuit 210 generates the FG signal according to the Hall signal $S_{HALL}$. The output circuit 282 outputs the FG signal from a terminal FG to the outside. Details associated with generation of the FG signal by the control logic circuit 210 are described below.

When the motor 102 rotates stably, the Hall signal $S_{HALL}$ is directly used to generate the FG signal.

The generation of the FG signal before the motor 102 rotates stably, that is, at startup of the motor, is described below.

The control logic circuit 210 includes a sequence generator 212, a mode generator 214, an internal Hall signal generator 216 and an FG signal generator 218. The sequence generator 212 is a state machine and controls the state of the motor driver circuit 200. The mode generator 214 generates the control signal $S_{CNT}$ specifying the state of the inverter circuit 230 according to various states.

For example, the motor driver circuit 200 may take states ϕ1 to ϕ7 below.

First State ϕ1

In the first state ϕ1, the control logic circuit 210 sets the outputs OUTU, OUTV and OUTW of the inverter circuit 230 to a high-impedance (HiZ) state. The first state ϕ1 is used for idling determination.

Second State ϕ2

In the second state ϕ2, the control logic circuit 210 sets the outputs OUTU, OUTV and OUTW of the various phases of the inverter circuit 230 to predetermined states. The predetermined states are not specifically defined, and in one example, OUTU=H, OUTV=L and OUTW=H. The second state ϕ2 is used for fixing a rotor having an uncertain position at a predetermined position (referred to as a default position) and is also referred to as a default position fixing period.

Third State ϕ3

In the third state ϕ3, the control logic circuit 210 switches the states of the outputs OUTU, OUTV and OUTW of the various phases of the inverter circuit 230 at a predetermined interval in a predetermined sequence, that is, irrelevant to the change in the Hall signal $S_{HALL}$. The third state ϕ3 is referred to as a compulsory synchronous startup period.

Fourth State ϕ4

In the fourth state ϕ4, the control logic circuit 210 synchronizes the states of the outputs OUTU, OUTV and OUTW of the various phases of the inverter circuit 230 with the Hall signal $S_{HALL}$, that is, synchronizing with the rotation of the rotor, and switches the states in a predetermined sequence (commutation control). The fourth state ϕ4 is a period for the motor 102 to rotate stably and is also referred to as a Hall drive period. In the fourth ϕ4, the outputs OUTU, OUTV and OUTW of the three phases are controlled by means of 120° energization or 180° energization.

Under 120° energization, a coil (a driving phase) supplying a drive current is switched (commutation control) in synchronization with the Hall signal $S_{HALL}$.

Under 180° energization, the driving phase is switched (commutation control) based on the Hall signal $S_{HALL}$. Moreover, under 180° energization, waveform data SINU to SINW for a sinusoidal drive are generated according to the rotation speed of the motor 102, and the PWM control on the inverter circuit 230 is performed based on the waveform data SINU to SINW.

Fifth State ϕ5

In the fifth state ϕ5, similar to the first state ϕ1, the control logic circuit 210 sets the outputs OUTU, OUTV and OUTW of the inverter circuit 230 to a high-impedance (HiZ) state.

Sixth State ϕ6

In the sixth state ϕ6, the control logic circuit 210 fixes the outputs OUTU, OUTV and OUTW of the phase of the inverter circuit 230 to a same level (for example, all set to zero). In a case where the motor is locked due to a foreign object caught in the fan motor, there is a concern that an overcurrent can flow through the coil or the semiconductor element and damage the reliability of devices. To handle such issue, the sixth state ϕ6 corresponds to a lock protection period in which energization to the coil of the motor is stopped when the motor is stopped.

Seventh State ϕ7

In the seventh state ϕ7, similar to the sixth state ϕ6, the control logic circuit 210 fixes the outputs OUTU, OUTV and OUTW of the various phases of the inverter circuit 230 to a same level (for example, all set to zero). The seventh state 47 corresponds to a brake period in which an idling rotor is forced to stop when the fan motor is started.

Figure 2A:
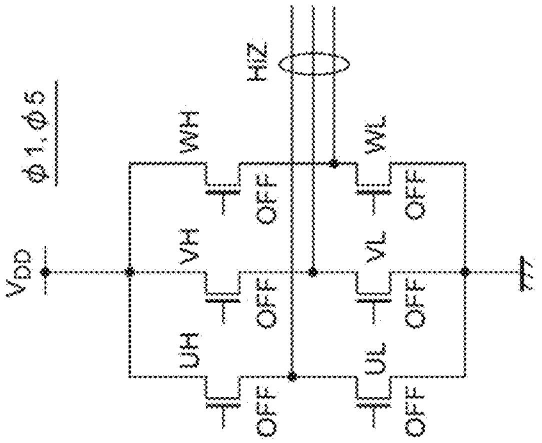
FIG. 2A to FIG. 2C are diagrams of states of an inverter circuit.
Figure 2B:
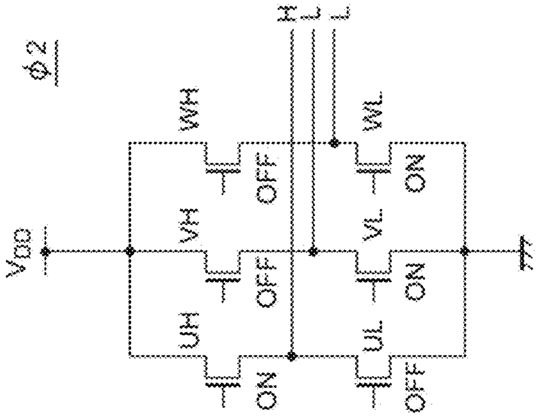
Figure 2C:
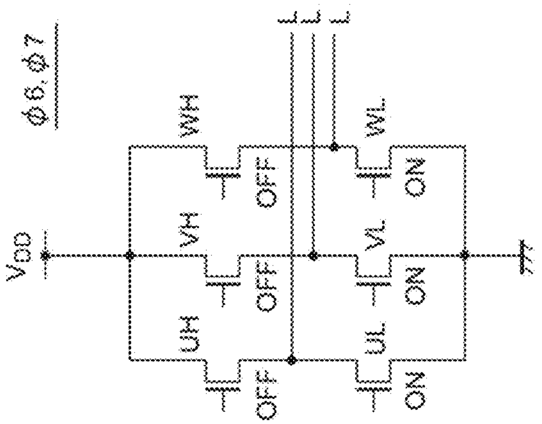

FIG. 2A to FIG. 2C show a diagram of the states of the inverter circuit 230. The left of FIG. 2A to FIG. 2C represents the first state ϕ1 and the fifth state ϕ5, the center of FIG. 2A to FIG. 2C represent the second state ϕ2, and the right of FIG. 2A to FIG. 2C represent the sixth state ϕ6 and the seventh state ϕ7. State control of the inverter circuit 230 in the third state ϕ3 and the fourth state ϕ4 only need to be determined according to a drive mode. The mode generator 214 generates the control signal $S_{CNT}$ corresponding to the individual states ϕ1 to ϕ7.

Figure 3:
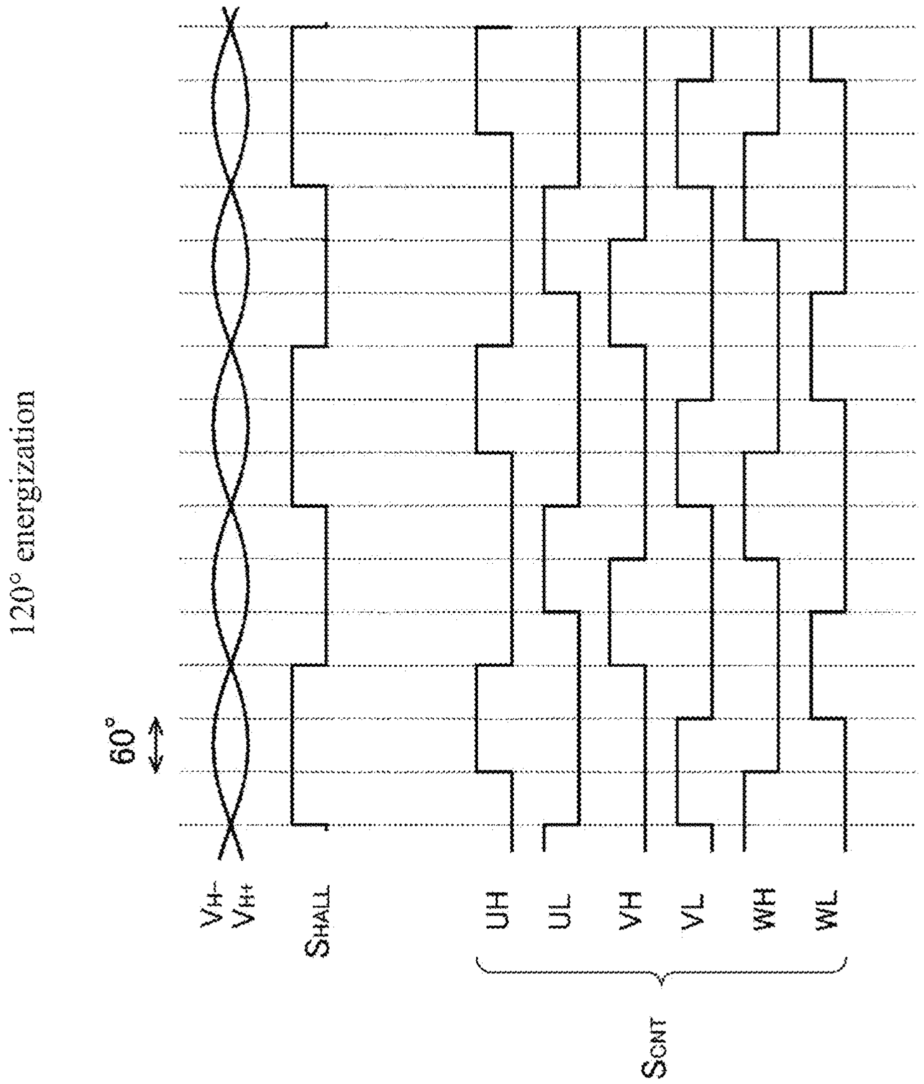
FIG. 3 is a diagram of signals generated in a fourth state (a Hall driving period) under 120° energization.

FIG. 3 shows a diagram of signals generated in the fourth state (the Hall driving period) ϕ4 under 120° energization. Regarding the third state ϕ3, the state of the inverter circuit 230 only needs to change by a same sequence. Moreover, the phase of the Hall signal $S_{HALL}$ is determined according to a mounting position of the Hall element 104.

Figure 4:
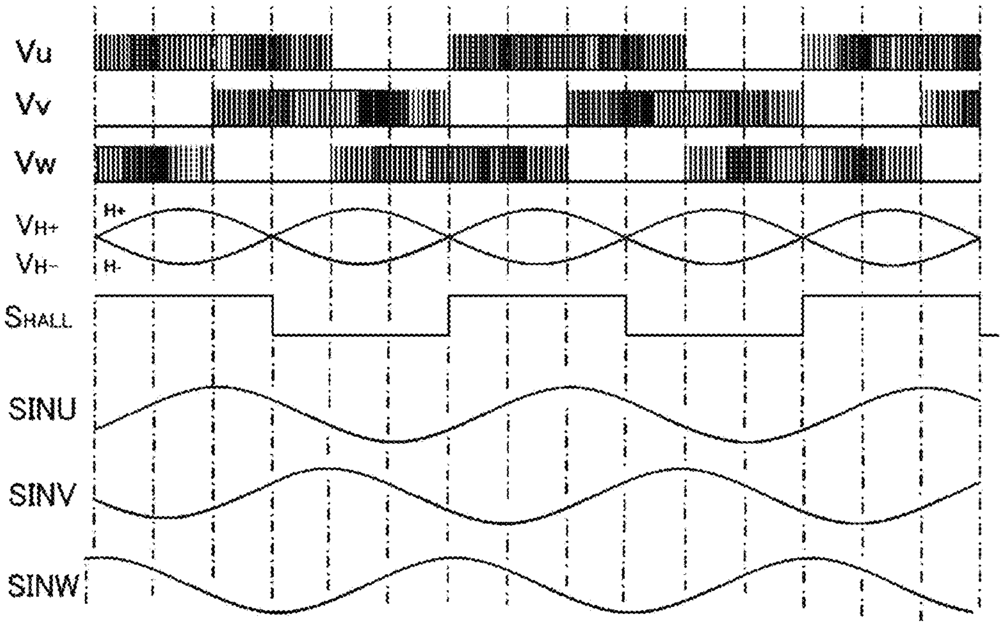
FIG. 4 is a diagram of signals generated in a fourth state (a Hall driving period) under 180° energization.

FIG. 4 shows a diagram of signals generated in the fourth state (the Hall driving period) ϕ4 under 180° energization. Herein, although ideal sine waves as the waveform data SINU to SINW are depicted, the waveforms thereof differ according to a modulation scheme (two-phase modulation or three-phase modulation). For example, in two-phase modulation, sine waves with two peaks are sometimes used. In addition, in substitution for sine waves, trapezoidal waves or step waves in simplified forms are used in some cases.

As shown in FIG. 4, respective periods of the waveform data SINU to SINW need to be consistent with the period of the Hall signal $S_{HALL}$. Thus, the generation of the waveform data SINU to SINW requires information related to the current rotation speed of the motor. For example, the control logic circuit 210 can also generate the waveform data SINU to SINW by using a unit of the time of a 60° electrical angle.

In this case, the control logic circuit 210 can also obtain the time of a 60° electrical angle as the rotation speed information of the rotation speed of the motor 102, so as to generate the waveform data SINU to SINW corresponding to a time scale of the rotation speed information. Moreover, the waveform data SINU to SINW can also be generated based on the BEMF signal.

Thus, under 180° energization, the driving waveforms SINU to SINW with cycles corresponding to the rotation speed of the motor 102 need to be generated. During an acceleration period of a motor, even if a rotation speed (a period) at a certain moment is detected, the rotation speed of the motor can be different from the rotation speed measured at a next moment when it is used, such that the control becomes unstable. Thus, 120° energization can be used in the third state $\phi 3$ to accelerate the motor 102 and is then switched to 180° energization after a transition to the fourth state $\phi 4$.

In this embodiment, the start sequence is switched according to the state of the motor 102 when the motor 102 is started, that is, when a rotation start instruction is applied to the motor driver circuit 200. The rotation start instruction can be connection of a power supply or can be assertion of a start signal.

(a) When the rotation start, instruction is applied to the motor driver circuit 200, while the motor 102 is substantially stopped, the motor 102 starts according to a transition sequence of the first state $\phi 1$, the second state $\phi 2$, the third state $\phi 3$ and the fourth state $\phi 4$. A state of substantially stopped is a state in which a rotation speed lower than a predetermined rotation speed threshold $f_1$ that is set to about zero, in other words, a state in which a period of the Hall signal $S_{HALL}$ (a full period or half period) t is longer than a predetermined threshold $\tau_1$. $\tau_1$ is a threshold proportional to the reciprocal of $f_1$.

(b) When the rotation start instruction is applied to the motor driver circuit 200, the motor 102 rotates at a speed higher than the predetermined rotation speed $f_1$ and lower than a predetermined rotation speed $f_2$, in other words, when the period (full period or half period) t of the Hall signal $S_{HALL}$ is shorter than the predetermined threshold value $\tau_1$ and longer than a threshold value $\tau_2$, transitions in a sequence of the first state $\phi 1$, the fifth state $\phi 5$, the second state $\phi 2$, the third state $\phi 3$ and the fourth state $\phi 4$ take place, and the motor 102 starts. 12 is a constant proportional to the reciprocal of $f_2$, and a relationship of $\tau_2<\tau_1$ holds true.

(c) When the rotation start instruction is applied to the motor driver circuit 200, the motor 102 rotates at a speed higher than the predetermined rotation speed $f_2$, in other words, when the period (full period or half period) $\tau$ of the Hall signal $S_{HALL}$ is shorter than the predetermined threshold value $\tau_2$, transitions in a sequence of the first state $\phi 1$, the fifth state $\phi 5$ and the fourth state $\phi 4$ take place, and the motor 102 starts.

Figure 5:
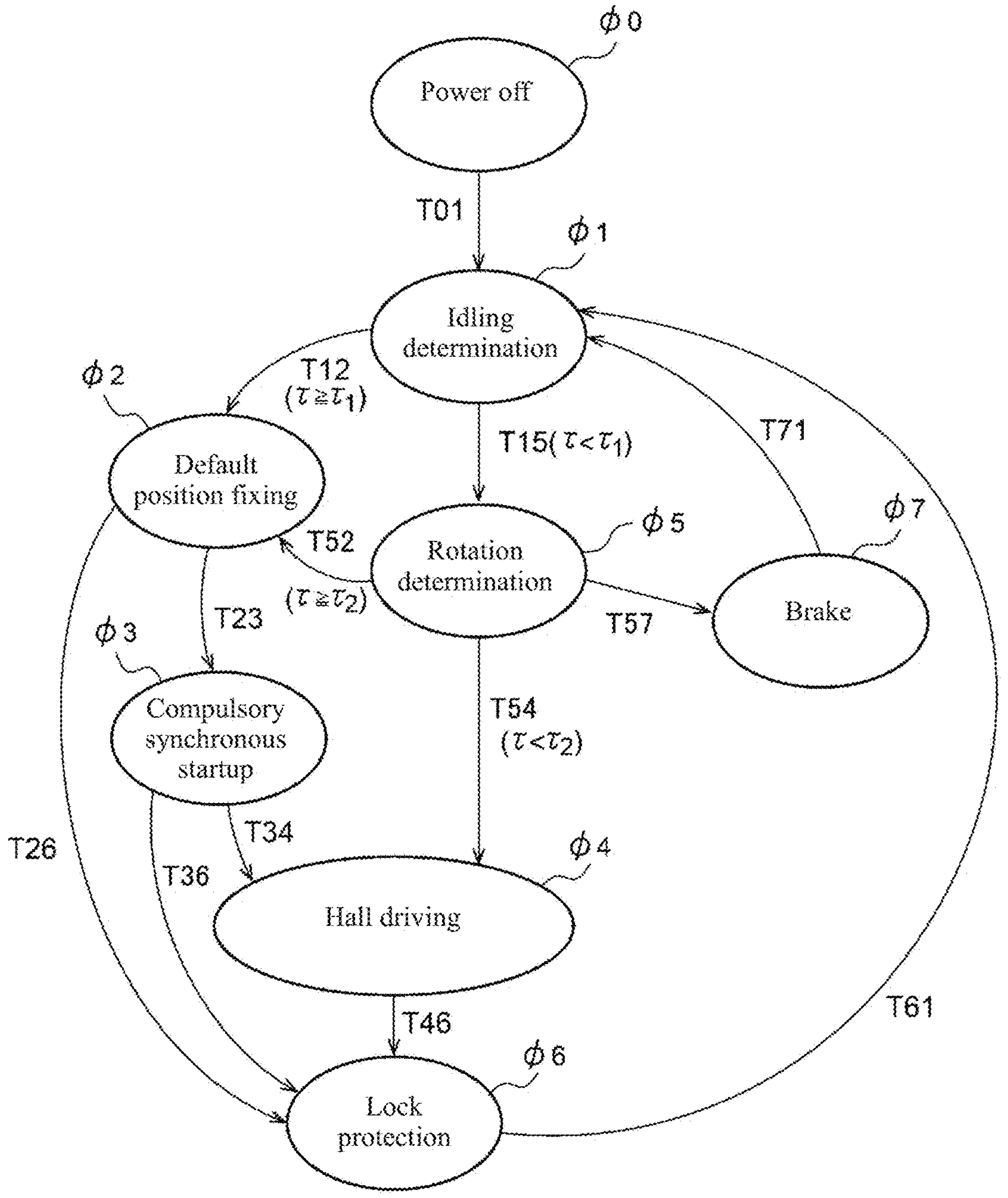
FIG. 5 is a diagram of state transitions of a control logic circuit.

FIG. 5 shows a diagram of state transitions of the control logic circuit 210. A stop state is 80 before a power supply is connected. When a power supply is connected, the stop state $\phi 0$ transitions to the first state $\phi 1$ (T01). Txy represents a transition from a state $\phi x$ to a state $\phi y$.

Shortly after the power supply is connected, it is not guaranteed that the motor 102 is stopped and may be idling. Thus, in the first state $\phi 1$ shortly after a power supply is connected, idling determination is performed. More specifically, the outputs of all of the three phases of the inverter circuit 230 are set to high-impedance and the Hall signal $S_{HALL}$ is monitored. If the motor 102 is fully stopped, the Hall signal $S_{HALL}$ remains at high or low and no level (that is, edge) transition is generated.

The control logic circuit 210 (i-1) monitors the Hall signal $S_{HALL}$, and no transition (that is, no edge) of the Hall signal $S_{HALL}$ is detected ($\tau>\tau_1$) within a period of the predetermined first time $\tau_1$ (for example, 100 ms), in other words, when the half period t of the Hall signal $S_{HALL}$ is longer than the threshold 11, the motor 102 substantially stops, and a transition to the second state $\phi 2$ (T12) takes place.

In the first state $\phi 1$, the control logic circuit 210 (i-2) transitions to the fifth state $\phi 5$ (T15) at an interval of a change of the Hall signal $S_{HALL}$, that is, while the half period t is shorter than the first time $\tau_1$ ($\tau<\tau_1$). According to the processing, for example, when $\tau_1$=100 ms and a 4-order motor is used, an idling state is determined when the rotation speed f is higher than $f_1$=150 rpm ($f>f_1$), and a stopped state is determined when the rotation speed f is lower than $f_1$ ($f\leq f_1$). In order to suppress influences of noise, the control logic circuit 210 can also transition to the fifth state $\phi 5$ from the first state $\phi 1$ when it is consecutively detected multiple times (M≥2, where M=2 for example) that the interval of the change in the Hall signal $S_{HALL}$ is shorter than the first time $\tau_1$.

As described above, in the default state while the motor 102 is stopped, transitions take place according to a sequence of the second state $\phi 2$, the third state $\phi 3$ and the fourth state $\phi 4$.

More specifically, in the second state $\phi 2$, a combination of the outputs OUTU to OUTW applied to the motor 102 is fixed. In the state above, the position of the rotor of the motor 102 is fixed at a target default position corresponding to the combination of the outputs, and at this point in time, the Hall signal $S_{HALL}$ is expected to take an appropriate level (an expecting state) corresponding to the target default position.

In the second state $\phi 2$, the control logic circuit 210 (iii-1) transitions to the third state $\phi 3$ (T23) when the Hall signal $S_{HALL}$ has been kept in the third state $\phi 3$ for a third time $\tau 3$. Conversely, the control logic circuit 210 (iii-2) transitions to the sixth state $\phi 6$ when the Hall signal $S_{HALL}$ is unstable (for example, high) in the expecting state. For example, the control logic circuit 210 can also transition to the sixth state $\phi 6$ when the Hall signal $S_{HALL}$ has been kept in a non-expecting state (an inverted logic of the expecting state, for example, low) for a fourth time $\tau_4$, or when the Hall signal $S_{HALL}$ has switched a predetermined number of times. For example, $\tau_4$ can be defined as 1 s.

A transition takes place to the third state $\phi 3$ when it is determined that the rotor has moved to the target default position. Shortly after the transition to the third state $\phi 3$, the motor 102 does not rotate, and so the Hall signal $S_{HALL}$ takes a fixed level. Thus, driving cannot be performed in synchronization with the Hall signal $S_{HALL}$. In the third state $\phi 3$, irrelevant to the Hall signal $S_{HALL}$, the state (the driving phase) of the inverter circuit 230 is switched at a predetermined time interval. In the third state $\phi 3$, if a predetermined condition is met, a transition takes place to the fourth state $\phi 4$ (T34).

The predetermined condition is defined to be able to detect when the motor 102 starts to rotate correctly (successfully started). For example, the control logic circuit 210 can also transition to the fourth state $\phi 4$ when the output state of the inverter circuit 230 has switched a predetermined times (for example, 28 times), or when a phase difference between the Hall signal $S_{HALL}$ and the BEMF signal is less than a predetermined value.

In the third state $\phi 3$, a transition takes place to the sixth state $\phi 6$ (T36) in case of a start failure of the motor 102. For example, the control logic circuit 210 can also determine a start failure and transition to the sixth state $\phi 6$ when it cannot detect a change in the Hall signal $S_{HALL}$ within a period after a predetermined time (for example, 1 s) has elapsed from the transition to the second state $\phi 2$.

If the motor 102 is started successfully, a transition takes place to the fourth state $\phi 4$, and the periodic Hall signal $S_{HALL}$ can then be observed. Thus, the control logic circuit 210 controls the motor 102 in synchronization with the Hall signal $S_{HALL}$.

Moreover, in the fourth state $\phi 4$, if the rotation speed f of the motor 102 is lower than a low-speed threshold (a locked state) or higher than a high-speed threshold, a transition takes place to the sixth state $\phi 6$ (T46), and lock protection is implemented. After the transition to the sixth state $\phi 6$, the state returns to the first state $\phi 1$ (T61) if a predetermined protection time (for example, 5 s) has elapsed.

Figure 6:
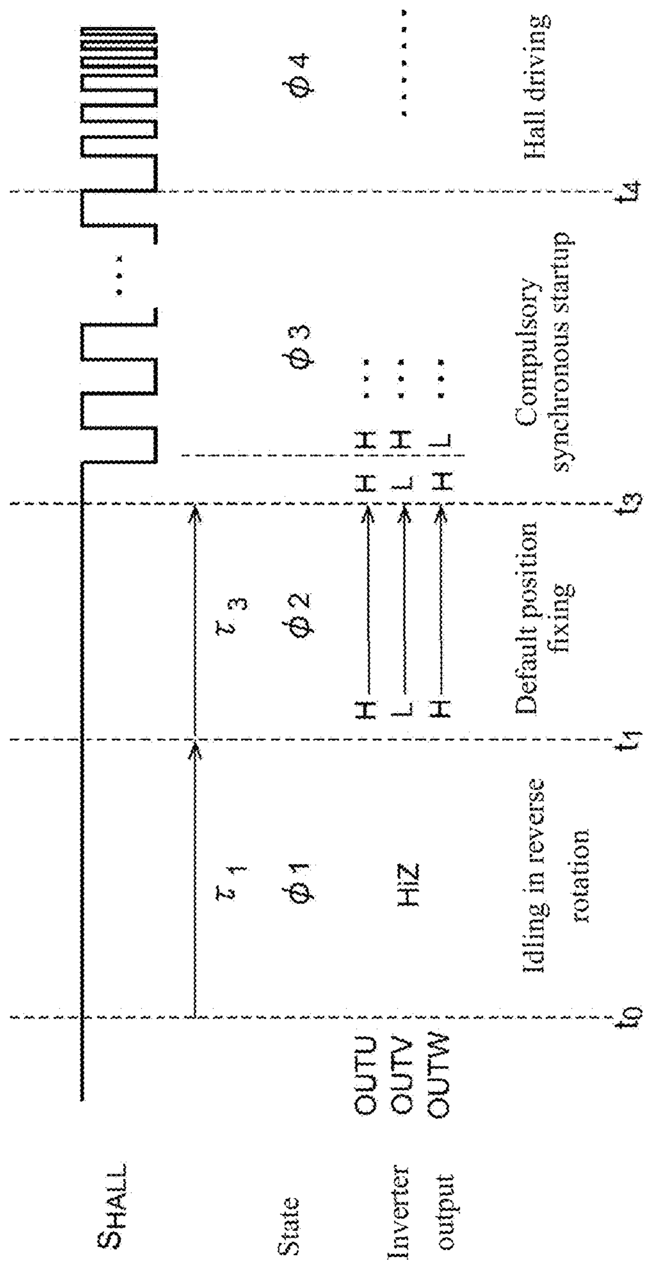
FIG. 6 is a timing diagram when a rotation of a motor stops in the beginning of startup.

FIG. 6 shows a timing diagram when the rotation of the motor 102 stops in the beginning of startup.

A power is connected at a timing t0 and is used as a startup instruction, and the control logic circuit 210 transitions to the first state $\phi 1$. After the motor 102 stops, the Hall signal $S_{HALL}$ is kept at a fixed level. If a change in the Hall signal $S_{HALL}$ is not generated throughout the first time t1, a transition takes place to the second state $\phi 2$ at a timing t1.

In the second state $\phi 2$, if the output of the inverter circuit 230 is fixed at a predetermined state (for example, when the U phase and the W phase are high and the V phase is low), the rotor moves to a position corresponding to the state. If the expecting state continues for a third time $\tau 3$, the Hall signal $S_{HALL}$ transitions to the third state $\phi 3$ at a timing t3.

In the third state $\phi 3$, the state of the output of the inverter circuit 230 changes constantly. Along with the change, the motor 102 starts to rotate, and the Hall signal $S_{HALL}$ also starts to change.

If it is detected that motor 102 is started successfully at a timing t4, a transition takes place to the fourth state $\phi 4$. In addition, in synchronization with the Hall signal $S_{HALL}$, the state of the inverter circuit 230 is switched, and the rotation speed f of the motor 102 increases to a target value.

The operation when the motor 102 starts to rotate in the beginning of startup is as described above. Next, again referring to FIG. 5, the operation of the motor 102 during idling in the beginning of startup is described below.

As described above, a transition takes place to the fifth state $\phi 5$ when the motor 102 is idling.

In the fifth state $\phi 5$, it is determined whether the rotation speed f of the motor 102 in an idling state is higher or lower than the rotation speed $f_2$. The rotation speed $f_2$ can be set to be higher than the rotation speed $f_1$, for example, set to be about 400 rpm.

In addition, in an idling state, when the motor 102 in idling is slower than the rotation speed $f_2$ ($f<f_2$), in other words, when the period T (a full period or half period) of the Hall signal $S_{HALL}$ is longer than the predetermined threshold value $\tau_2$, a transition takes place to the second state $\phi 2$ (T52). Subsequent transitions are as those described above.

In an idling state, when the motor 102 rotates by a rotation speed faster the rotation speed $f_2$ ($f>f_2$), in other words, when the period T (a full period or half period) of the Hall signal $S_{HALL}$ is shorter than the predetermined threshold value $\tau_2$, the second state $\phi 2$ and the third state $\phi 3$ are skipped, and a transition takes place directly to the fourth state $\phi 4$ (T54).

For example, the control logic circuit 210 can also (ii-1), in the fifth state $\phi 5$, transition to the fourth state $\phi 4$ when the period (for example, an interval between a negative edge and another negative edge, or an interval between a positive edge and another positive edge) of the Hall signal $S_{HALL}$ is shorter than the predetermined second time $\tau_2$, and (ii-2) transition to the second state $\phi 2$ other than the case above. For example, in a 4-order motor, when $\tau_2$=75 ms, $f_2$=400 rpm. In order to suppress the influence of noise, the control logic circuit 210 detects a change in the Hall signal $S_{HALL}$ at intervals shorter than the second time $\tau 2$ multiple times (for example, three times) consecutively in the fifth state $\phi 5$. Subsequently, the state may transition to the fifth state $\phi 5$.

In the fifth state $\phi 5$, a transition takes place to the seventh state $\phi 7$ (T57) in a case where the motor 102 is idling in reverse rotations. A determination for the reverse rotation can be determined according to a position relationship between the Hall signal $S_{HALL}$ and the BEMF signal.

In the seventh state $\phi 7$, braking is applied to the motor 102. After the transition to the seventh state $\phi 7$, the state returns to the first state $\phi 1$ if a predetermined brake time (for example, 5 s) has elapsed.

Figure 7:
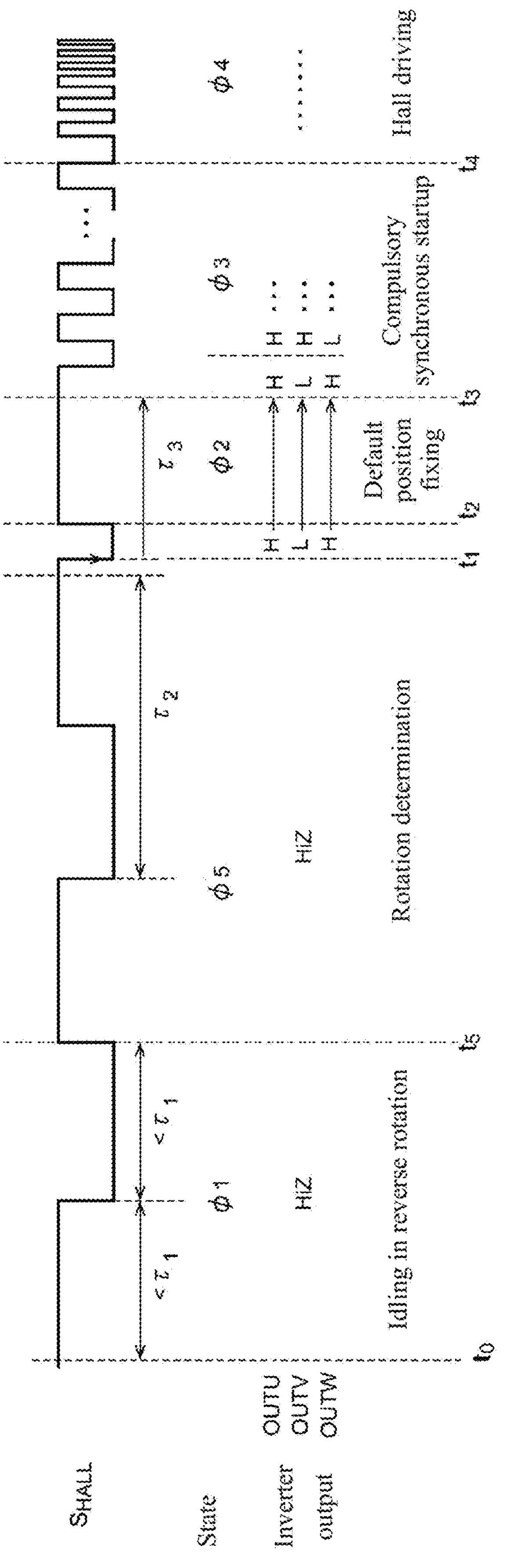
FIG. 7 is a timing diagram when a motor is idling by rotating at a speed slower than a rotation speed in the beginning of startup.

FIG. 7 shows a timing diagram when the motor 102 is idling by rotating at a rotation speed slower than the rotation speed $f_2$ in the beginning of startup. Startup takes places in the first state $\phi_1$ at the timing to. After transitioning to the first state $\phi_1$, if it is detected M times (twice herein) that the interval of the change in the Hall signal $S_{HALL}$ is shorter than the first time $\tau_1$, a transition takes place to the fifth state $\phi 5$ (a timing $t_5$). At the timing t1, if it is detected that the period of the Hall signal $S_{HALL}$ is longer than the second time t2, a transition takes place to the second state $\phi 2$. Subsequent details are the same as those in FIG. 6.

Figure 8:
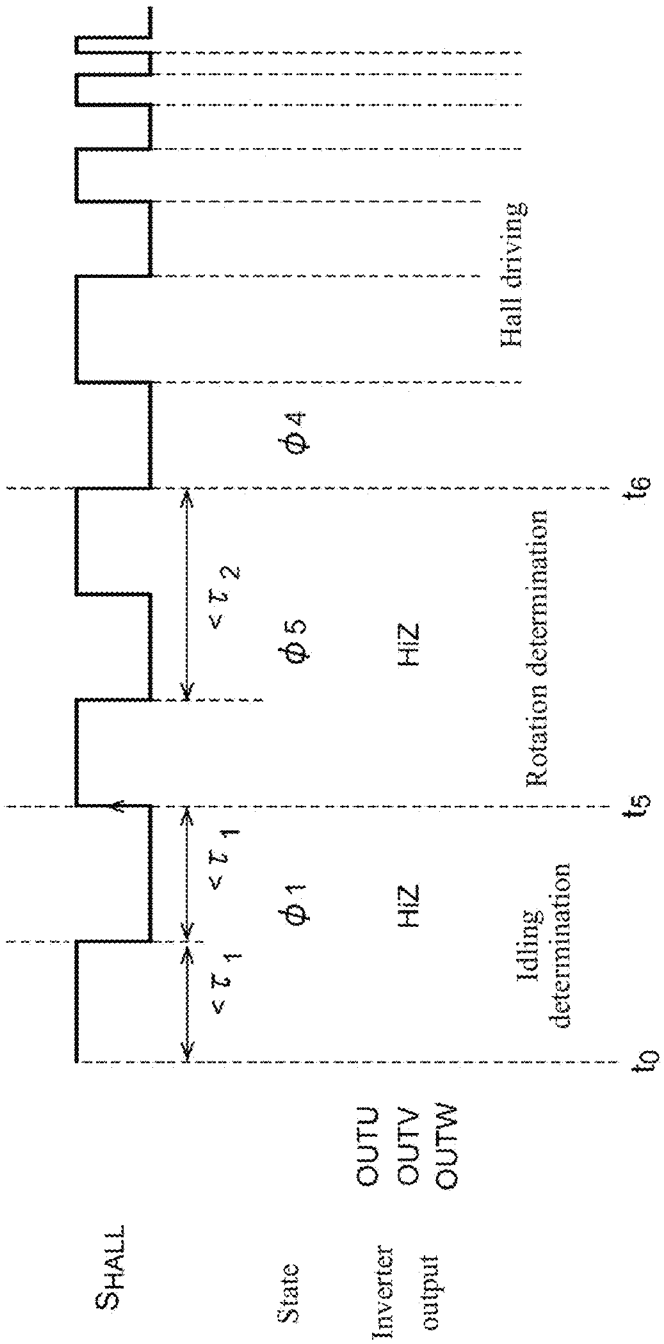
FIG. 8 is a timing diagram when a motor is idling by rotating at a speed faster than a rotation speed in the beginning of startup.

FIG. 8 shows a timing diagram when the motor 102 is idling by rotating at a rotation speed faster than the rotation speed $f_2$ in the beginning of startup. Startup takes places in the first state $\phi_1$ at the timing to. After transitioning to the first state $\phi 1$, if it is detected M times (twice herein) that the interval of the change in the Hall signal $S_{HALL}$ is shorter than the first time $\tau_1$, a transition takes place to the fifth state $\phi 5$ (the timing $t_5$).

In the fifth state $\phi 5$, if it is detected that the period of the Hall signal $S_{HALL}$ is shorter than the second time $\tau 2$, a transition takes place to the fourth state $\phi 4$ (a timing $t_6$). Herein, a case where if it is detected once that one period of the Hall signal $S_{HALL}$ is shorter than the second time $\tau_2$, a transition takes place to the fourth state $\phi 4$, is described. However, preferably, having continuously detected the same above throughout a plurality of periods (for example, three periods) can also be used as a condition for transitioning to the fourth state $\phi 4$.

After the timing to, the control signal $S_{CNT}$ is generated in synchronization with the Hall signal $S_{HALL}$ to control the inverter circuit 230.

The startup sequence of the motor driver circuit 200 is as described above.

Next, details associated with generation of the FG signal during the compulsory synchronous startup period are described below.

During the compulsory synchronous startup period, the mode generator 214 generates the control signal $S_{CNT}$ of an energization pattern for a compulsory synchronous drive and supplies the control signal $S_{CNT}$ to the pre-driver 220. The energization pattern is irrelevant to the position of the rotor, that is, irrelevant to the state of the Hall signal $S_{HALL}$, and is performed at a predetermined time interval.

A high detection period TH and a low detection period TL are defined corresponding to the energization pattern for a compulsory synchronous drive. The high detection period TH is a period in which the Hall signal $S_{HALL}$ should be high by assuming that the rotor is idling by following the energization pattern, and the low detection period TL is a period in which the Hall signal $S_{HALL}$ should be low by assuming that the rotor is idling by following the energization pattern. The sequence generator 212 generates, for example, a timing signal H/L which is high in the high detection period TH and low in the low detection period TL and supplies the timing signal H/L to the internal Hall signal generator 216. The timing signal H/L can also be said as an expected value of the Hall signal $S_{HALL}$.

The internal Hall signal generator 216 generates an internal Hall signal $S_{HALL(INT)}$ based on the Hall signal $S_{HALL}$ and the timing signal H/L. More specifically, the internal Hall signal generator 216 sets the internal Hall signal $S_{HALL(INT)}$ as high when a high level of the Hall signal $S_{HALL}$ is detected during the high detection period TH and sets the internal Hall signal $S_{HALL(INT)}$ as low when a low level of the Hall signal $S_{HALL}$ is detected during the low detection period TL.

The FG signal generator 218 generates the FG signal corresponding to the internal Hall signal $S_{HALL(INT)}$. The FG signal can be a signal the same as the internal Hall signal $S_{HALL(INT)}$ or can be a frequency-divided signal that is ½ times or ¼ times the Hall signal $S_{HALL(INT)}$.

Figure 9:
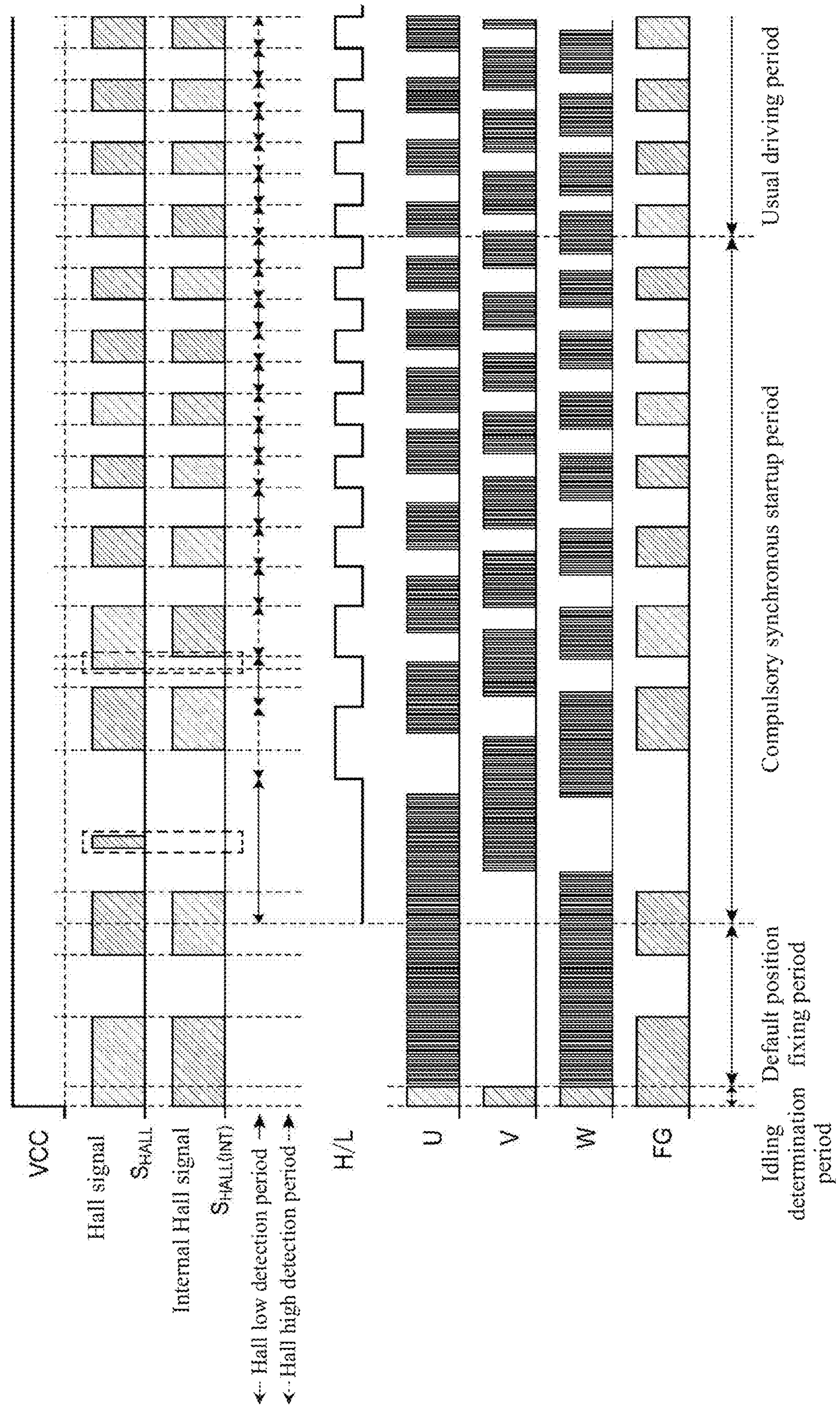
FIG. 9 is a diagram of generation of an FG signal during a compulsory synchronous startup period.

FIG. 9 shows a diagram of generation of the FG signal during a compulsory synchronous startup period. The high level of the Hall signal $S_{HALL}$ generated between the low detection period TL indicated by the dotted line (i) is omitted.

Moreover, the high level of the Hall signal $S_{HALL}$ generated between the low detection period TL indicated by the dotted line (ii) is omitted. Then, if the Hall signal $S_{HALL}$ that became high in the low detection period TL remains high and moves to the next high detection period TH, the internal Hall signal $S_{HALL(INT)}$ changes to high.

The generation of the FG signal during the compulsory synchronous startup period is as described above. According to the motor driver circuit 200, when flutter in the Hall signal $S_{HALL}$ is generated due to swinging of the rotor, the waveform of the internal Hall signal $S_{HALL(INT)}$ does not contain any flutter, and the FG signal can be generated correctly.

The embodiments are described as above. A person skilled in the art should understand that these embodiments are merely examples and there are various variation examples in the combinations of the constituting elements and processes of these embodiments. Moreover, such variation examples are encompassed within the scope of the present disclosure. Details of such variation examples are described below.

Variation Example 1

In the embodiment, a case where the motor driver circuit 200 is built in with the inverter circuit 230 is described; however, the present disclosure is not limited to the example above, and the inverter circuit 230 can also be implemented by a discrete component and externally provided. In this case, the pre-driver 220 can also be disposed outside the motor driver circuit 200.

Variation Example 2

The driving target of the motor driver circuit 200 is not limited to a fan motor but is also applicable to driving various three-phase brushless motors.

(Use)

Figure 10:
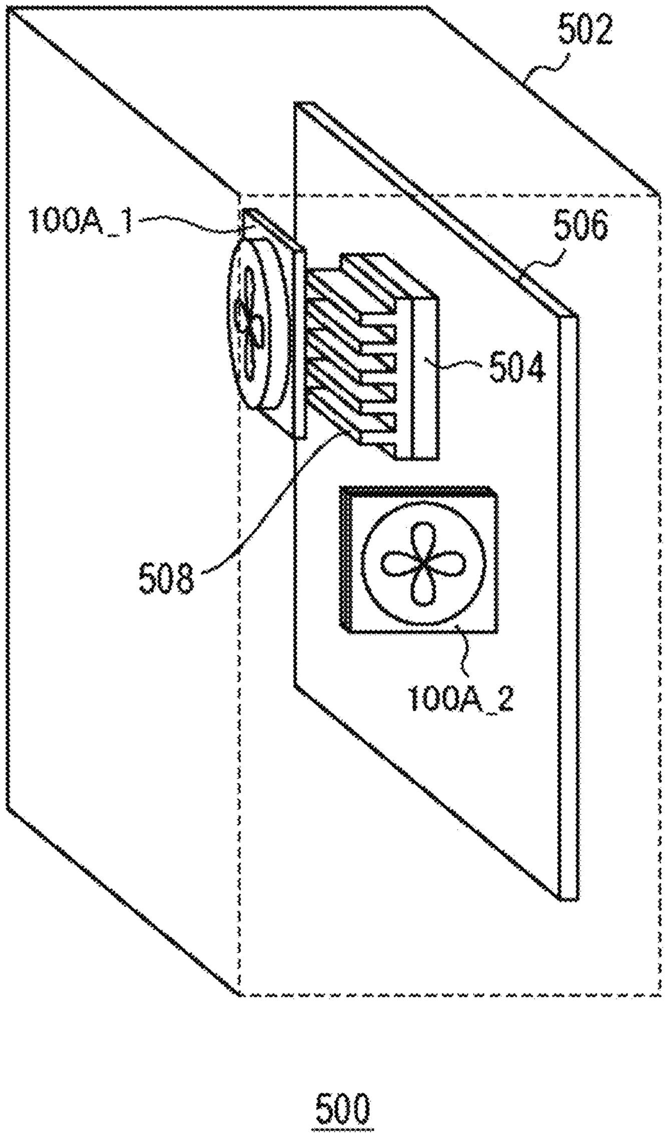
FIG. 10 is a perspective diagram of a computer including a cooling device.

Next, the use of the motor driver circuit 200 is described. FIG. 10 shows a perspective diagram of a computer 500 including a cooling device 100A. The cooling device 100A includes the motor 102, and the motor driver circuit 200 in FIG. 1. The computer 500 includes a housing 502, a CPU 504, a motherboard 506, a cooling fin 508, and a plurality of cooling devices 100A_1 and 100A_2.

The CPU 504 is mounted on the motherboard 506. The cooling fin 508 is closely joined with an upper surface of the CPU 504. The cooling device 100A_1 is disposed opposite to the cooling fin 508 and blows air to the cooling fin 508. The cooling device 100A_2 is disposed on a back surface of the housing 502 and draws air outside the housing 502 to the inside or discharges internal air to the outside.

Since the cooling device 100A of the embodiment is able to start the motor 102 within a short time, a cooling target can be quickly cooled.

In addition to the computer 500 in FIG. 10, the cooling device 100A can be mounted on various electronic apparatuses such as workstations, laptop computers, televisions and refrigerators.

The embodiments described in specific terms are for conveying principles and applications of the present disclosure, and variations and modifications to the configurations may be made to these embodiments without departing from the conceptive scope of the present disclosure defined in the appended claims.

[Note]

The technology of the present disclosure is disclosed herein.

[Note 1]

A motor driver circuit, comprising a control logic circuit that controls a bridge circuit connected to a motor based on a Hall signal, wherein the control logic circuit is configured to generate an energization pattern for a compulsory synchronous drive,
switch between a high detection period and a low detection period in accordance with the energization pattern,
set an internal Hall signal as high when a high level of the Hall signal is detected during the high detection period,
set the internal Hall signal as low when a low level of the Hall signal is detected during the low detection period, and
generate an FG signal according to the internal hall signal.

[Note 2]

The motor driver circuit of Note 1, further comprising the bridge circuit.

[Note 3]

The motor driver circuit of Note 1 or 2, wherein the motor driver circuit is integrated with a semiconductor substrate.

[Note 4]

The motor driver circuit of any one of Notes 1 to 3, wherein the motor is a fan motor.

[Note 5]

A cooling device, comprising:
a fan motor with a sensor; and
the motor driver circuit of any one of Notes 1 to 4 for driving the motor.

[Note 6]

An electronic apparatus, comprising:
a processor;
a fan motor for cooling the processor; and
the motor driver circuit of any one of Notes 1 to 4 for driving the motor.

[Note 7]

A driving method for driving a motor, comprising:

generating a hall signal;

generating an energization pattern for a compulsory synchronous drive, and switching between a high detection period and a low detection period in accordance with the energization pattern;

setting an internal Hall signal as high when a high level of the Hall signal is detected during the high detection period, and setting the internal Hall signal as low when a low level of the Hall signal is detected during the low detection period; and generating an FG signal according to the internal Hall signal.

The invention claimed is:

1. A motor driver circuit, comprising a control logic circuit that controls a bridge circuit connected to a motor based on a Hall signal, wherein the control logic circuit comprises:

a mode generator configured to generate an energization pattern for a compulsory synchronous drive;

a sequence generator configured to define a high detection period and a low detection period corresponding to the energization pattern, and to generate a timing signal that is high during the high detection period and low during the low detection period; and an internal Hall signal generator configured to generate an internal Hall signal based on the Hall signal and the timing signal, wherein the control logic circuit generates an FG signal according to the internal Hall signal.

2. The motor driver circuit of claim 1, further comprising the bridge circuit.

3. The motor driver circuit of claim 1, wherein the motor driver circuit is integrated with a semiconductor substrate.

4. The motor driver circuit of claim 2, wherein the motor driver circuit is integrated with a semiconductor substrate.

5. The motor driver circuit of claim 1, wherein the motor is a fan motor.

6. The motor driver circuit of claim 2, wherein the motor is a fan motor.

7. The motor driver circuit of claim 3, wherein the motor is a fan motor.

8. A cooling device, comprising:

a fan motor with a sensor; and the motor driver circuit of claim 1 for driving the motor.

9. An electronic apparatus, comprising:

a processor;

a fan motor for cooling the processor; and the motor driver circuit of claim 1 for driving the motor.

10. A driving method for driving a motor, comprising:

generating a Hall signal;

generating an energization pattern for a compulsory synchronous drive;

defining a high detection period and a low detection period corresponding to the energization pattern, and generating a timing signal that is high during the high detection period and low during the low detection period;

generating an internal Hall signal based on the Hall signal and the timing signal; and generating an FG signal according to the internal Hall signal.

* * * * *